United States Patent
Yin

(10) Patent No.: US 10,979,759 B2
(45) Date of Patent: Apr. 13, 2021

(54) ANALYSIS METHOD, DEVICE AND STORAGE MEDIUM OF MOOV BOX

(71) Applicant: Beijing Bytedance Network Technology Co., Ltd., Beijing (CN)

(72) Inventor: Guohui Yin, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 0 days.

(21) Appl. No.: 17/021,967

(22) Filed: Sep. 15, 2020

(65) Prior Publication Data

US 2020/0413123 A1  Dec. 31, 2020

Related U.S. Application Data

(63) Continuation of application No. PCT/CN2018/103550, filed on Aug. 31, 2018.

(30) Foreign Application Priority Data

May 29, 2018  (CN) .......................... 201810532331.8

(51) Int. Cl.
*H04N 21/43* (2011.01)
*H04N 21/234* (2011.01)
(Continued)

(52) U.S. Cl.
CPC . *H04N 21/4307* (2013.01); *H04N 21/234318* (2013.01); *H04N 21/434* (2013.01)

(58) Field of Classification Search
CPC ....... H04N 21/234318; H04N 21/4307; H04N 21/434
(Continued)

(56) References Cited

U.S. PATENT DOCUMENTS

2009/0199100 A1* 8/2009 Hwang ................. G11B 27/32
715/723
2009/0319679 A1* 12/2009 Okada .................... H04L 67/06
709/230

(Continued)

FOREIGN PATENT DOCUMENTS

CN   101828351 A   9/2010
CN   102221998 A   10/2011
(Continued)

OTHER PUBLICATIONS

International Patent Application No. PCT/CN2018/103550; Int'l Search Report; dated Feb. 19, 2019; 2 pages.

*Primary Examiner* — Dominic D Saltarelli
(74) *Attorney, Agent, or Firm* — BakerHostetler

(57) ABSTRACT

An analysis method, device and storage medium of an moov box is provided. The method includes acquiring binary data corresponding to the moov box in binary data of the media file based on a location of the moov box in a media file; sequentially analyzing binary data with a standard length in obtained binary data corresponding to ance moov box header to obtain a box type of a sub-box in the moov box and a length of box data of the sub-box; and invoking a parser with a type corresponding the box type of the sub-box, sequentially analyzing binary data corresponding to a length of the box data in unanalyzed data to obtain media information represented by the box data.

19 Claims, 7 Drawing Sheets

(51) Int. Cl.
*H04N 21/434* (2011.01)
*H04N 21/2343* (2011.01)

(58) Field of Classification Search
USPC .................................................. 375/240.28
See application file for complete search history.

(56) References Cited

U.S. PATENT DOCUMENTS

2015/0195588 A1* 7/2015 Park ............... H04N 21/234327
  725/96
2020/0077161 A1* 3/2020 Lohmar ................ H04L 65/602

FOREIGN PATENT DOCUMENTS

| CN | 102917276 A | 2/2013 |
| CN | 103533094 A | 1/2014 |
| CN | 107979783 A | 5/2018 |

\* cited by examiner

ANALYSIS METHOD, DEVICE AND STORAGE MEDIUM OF MOOV BOX

CROSS-REFERENCE TO RELATED APPLICATION

The disclosure is a continuation of PCT application Ser. No. PCT/CN2018/103550, filed on Aug. 31, 2018, which claims the priority benefit of CN application Ser. No. 201810532331.8, filed on May 29, 2018. The entirety of the above-mentioned patent application is hereby incorporated by reference herein and made a part of this specification.

TECHNICAL FIELD

The disclosure relates to a multimedia data technology, and more particularly to an analysis method, a device and a storage medium of an moov box.

DESCRIPTION OF RELATED ART

The moov encapsulated in a media file loads media information, which can accurately decode media data such as a video frame and an audio frame encapsulated in the media file according to the media information, so as to prevent phenomena like asynchrony between video and audio, or any loss of video frames.

When the media file is transmitted and broadcasted over the network, instantaneity of the broadcast demands for resolving the media information from the moov precisely and efficiently, in order to avoid delay in playing.

SUMMARY

Accordingly, embodiments of the disclosure provide an analysis method, a device and a storage medium of an moov box capable of decoding the media information from the moov precisely and efficiently.

Technical solutions of embodiments of the disclosure are achieved as follows.

An embodiment of the disclosure provides an analysis method of an moov box, including: based on a location of the moov box in a media file, acquiring binary data corresponding to the moov box in binary data of the media file; sequentially analyzing binary data with a standard length in obtained binary data corresponding to an moov box header to obtain a box type of a sub-box in the moov box and a length of box data of the sub-box; and invoking a parser with a type corresponding the box type of the sub-box, sequentially analyzing binary data corresponding to a length of the box data in unanalyzed data to obtain media information represented by the box data.

An embodiment of the disclosure further provides an analysis device of an moov box, including a data acquirer disposed to acquire binary data corresponding to the moov box from binary data in a media file according to a location of the moov box in the media file; and a data analyzer disposed to sequentially analyze binary data with a standard length in obtained binary data corresponding to a box header of the moov to obtain a box type of a sub-box in the moov box and a length of box data of the sub-box; the data analyzer is disposed to invoke a parser with a type corresponding the box type of the sub-box, and sequentially analyze binary data corresponding to a length of the box data in unanalyzed data to obtain media information represented by the box data.

Moreover, an embodiment of the disclosure further provides an analysis device of an moov device, including a memory disposed to store an executable instruction; and a processor disposed to follow the analysis method of an moov box according to embodiments of the disclosure to implement the executable instruction stored in the memory.

Moreover, an embodiment of the disclosure further provides a storage medium, storing an executable instruction, when the executable instruction is performed, the analysis method of an moov box provided by the embodiment of the disclosure can be implemented.

Embodiments of the disclosure have following technical effects. The technical solution provided by embodiments of the disclosure can efficiently accelerate the analysis of corresponding data in the moov box and improve the accuracy of data analysis, which can further prevent slow data analysis that disturbs manipulation of users.

DETAILED DESCRIPTION OF PREFERRED EMBODIMENTS

In order to better clarify the objective, technical scheme and advantages of the disclosure, the disclosure will be further illustrated in detail with reference to drawings therewith. The described embodiments should not be regarded as restriction to the disclosure. All the other embodiments obtained by a person skilled in the art without creativity should be included in the protective scope of the disclosure.

Unless otherwise specified, all technical and scientific terms employed in the disclosure represent the same meaning as those accepted by a person skilled in the art. The terms therein are purely for a purpose of depicting concrete embodiments rather than limiting the disclosure.

Before further expressing the disclosure, substantives and technical terms in embodiments of the disclosure will be explained. The substantives and technical terms in the embodiments of the disclosure refer to following definitions.

1) A media file indicates a file stores encoded media data such as at least one of audio data and video data in a manner of boxes, which likewise contains moov (aka. metadata) expressing the media information to ensure media data to be decoded correctly.

For instance, a media file formed by encapsulating MP4 box format encapsulation multimedia data with a Moving Picture Experts Group (MPEG)-4 is an MP4 file. Typically, the MP4 file stores Advanced Video Coding (AVC), namely H.264, or video data encoded by the MPEG-4 (Part 2) standard and audio data encoded by the Advanced Audio Coding (AAC) standard. There is no doubt that other encoding modes of video and audio will not be excluded.

Figure 1:
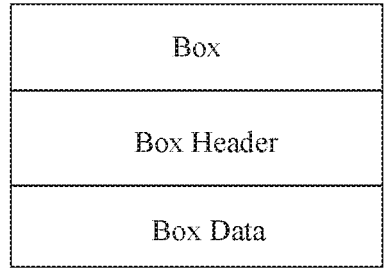
FIG. 1 is an optional structural schematic view of a box utilized for encapsulating multimedia files provided by an embodiment of the disclosure.

2) A box is a component of an object oriented defined by a sole type identifier and length, referring to FIG. 1, which is an optional structural schematic view of a box provided by an embodiment of the disclosure, including a box header and box data, and binary data conveying various information filled therein. Boxes can be mutually nested. When a series of sub-boxes is in data of a box, the box can be a container box.

Figure 2:
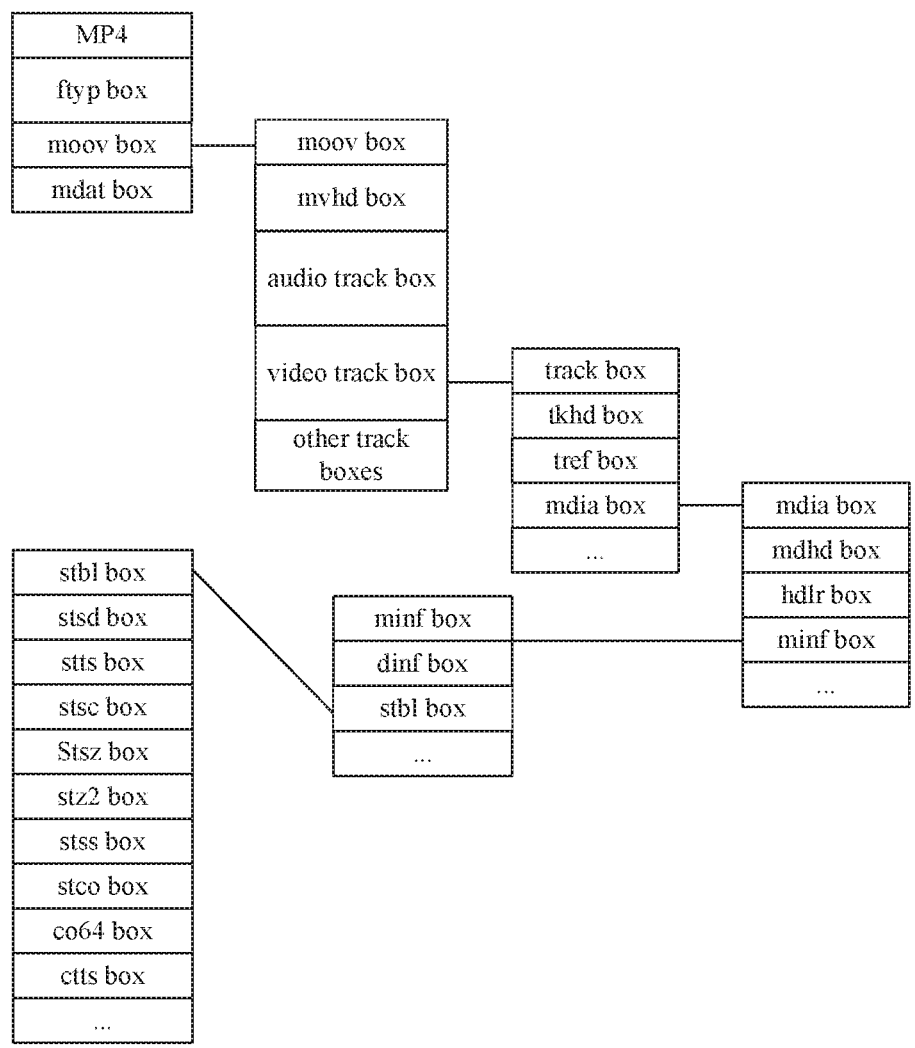
FIG. 2 is an optional schematic view of an encapsulation structure of an MP4 file in an embodiment of the disclosure.

The box header includes a size and a type. The size specifies the volume of the length storage space of the box occupied in the media file. The type specifies the type of the box. Referring to FIG. 2, which is an optional schematic view of an encapsulation structure of an MP4 file in an embodiment of the disclosure, fundamental types of boxes involved in the MP4 file contain an ftyp box, an moov box and an mdat box.

The box data section can store specific data, and the box is called a data box. The box data section can further encapsulate other types of boxes, and the boxes can be containers of boxes.

3) A track is also named a stream, which is a relative sample arranged in chronological order in the mdat box. Regarding the media data, the track signifies a video frame sequence or an audio frame sequence, further incorporating a subtitle track synchronized with the video frame sequence. A contiguous set of samples in one track are chunks.

4) An ftyp box is a box for storing the size, namely a length of occupied bytes, and the type of the file in the media file. As shown in FIG. 2, the binary data stored in the ftyp box describe the type and the compatibility of the file box according to the standard byte length.

5) An moov box is a box storing moov that is data to depict multimedia data in the mdat box in the media file. Information recorded as binary data stored in the moov box in the MP4 file is called media information.

As shown in FIG. 2, a type of the box header of the moov box recorded as binary data is the moov box. The box data section encapsulates an mvhd box configured for storing total information of the MP4 file, which is independent from the MP4 file, and relative to properties of the MP4 file, including duration, creation time and modification time, etc.

The mdat box of the media file can contain a sub-box corresponding to multiple tracks, such as an audio track box and a video track box. Sub-boxes of the audio track box and the video track box include quotation and description of the media data of corresponding tracks. Necessary sub-boxes include a box describing characteristics and total information such as duration, width and height, which is labelled as a tkhd box, and a box recording media information of tracks such as media types and sampling information, which is labeled as an mdia box.

Sub-boxes encapsulated in the mdia box can include a box recording relevant properties and contents of tracks, which is labeled as an mdhd box, a box recording playing procedure information of media, which is labeled as an hdlr box, a box describing the media information of media data in tracks, which is labeled as an minf box; the minf box further encapsulates a sub-box to interpret how to locate media information, which is labeled as a dinf box, and a sub-box configured for recording all the time information such as decoding time and displaying time, location information and encoding/decoding information of samples in tracks, which is labeled as an stbl box.

Figure 3:
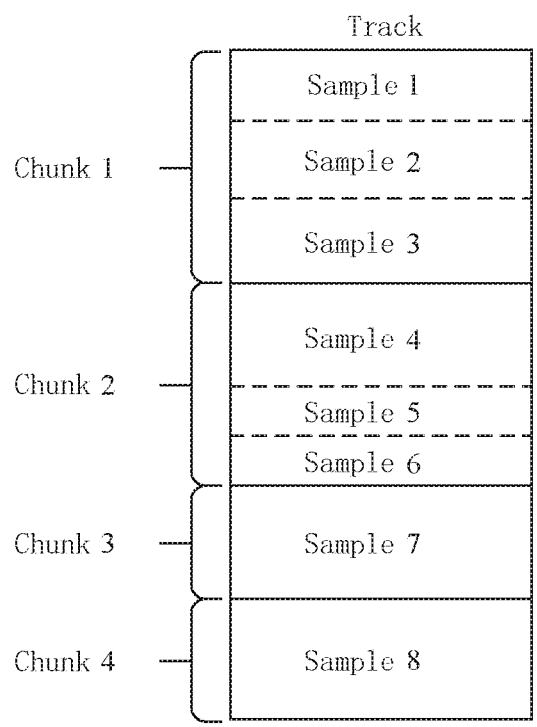
FIG. 3 is an optional structural schematic view of an mdat box storing media data in a media file in an embodiment of the disclosure.

Referring to FIG. 3, which is a structural schematic view of an mdat box storing media data in a media file provided by an embodiment of the disclosure, the time, type, size and location in the mdat box of samples can be explained by media information recognized from binary data in the stbl box. Each of the sub-boxes in the stbl box will be illustrated as follows.

The stsd box includes a sample description table. According to different encoding schemes and quantities of files storing data, each media file can have one or more description tables. The description information of each sample can be found through searching the description table. The description information can guarantee correctness in decoding samples. Each media type stores corresponding description information. For instance, with respect to a video medium, the description information is a structure of an image.

The stts box stores time information of samples, as well as providing a table for mapping time such as decoding time to the sequence number of a sample. A sample at any time in the media file can be located by the stts box; the stts box further uses other tables to map the size and pointer of a sample. Each entry in the table offers sequence numbers of successive samples in an identical time offset and the offset of samples. An intact mapping table of time-sample can be established by progressively increasing the offsets. A computational formula is as follows.

$$DT(n+1)=DT(n)+STTS(n) \quad (1)$$

Where $STTS(n)$ is the duration of an $n^{th}$ sample; $DT(n)$ is the display time of the $n^{th}$ sample. An order of the samples is in accordance with the time sequence; therefore, the offset will always be nonnegative. Generally, DT begins from 0, and taking the display time of an $i^{th}$ sample as an example, the computational formula is as follows.

$$DT(i)=SUM(\text{for } j=0 \text{ to } i-1 \text{ of delta}(j)) \quad (2)$$

The sum of all offsets is the duration of the media data in tracks.

An sStss (Time-To-Sample Atoms) box records sequence numbers of key frames in the media file.

An stsc (Sample-To-Chunk Atom) box records a mapping relation between samples and chunks storing the samples. The table maps the relation between the sequence numbers of samples and sequence numbers of chunks. The chunk containing a specific sample can be determined by searching the table.

A stco box defines the location of each chunk in tracks. The location is represented by the offset of an initial byte of the mdat box and a length corresponding to the initial byte, namely a size.

A stsz (Sample Size Atom) box records a volume/size of each sample in the media file.

6) An mdat box is a box configured for storing multimedia data in the media file. For instance, an mdat box in an MP4 file, as shown in FIG. 3, a sample is a unit in the mdat box stored in chunks of the media file; lengths of chunks and those of samples can mutually be different.

7) A fragmented media file is a sub-file formed by dividing the media file. Each fragmented media file can be decoded independently.

Taking the MP4 file as an example, the media data in the MP4 file can be divided according to the key frames. The divided media data and corresponding moov are encapsulated to form a fragmented MP4 (FMP4) file. The moov in each FMP4 file can ensure the media data to be decoded correctly.

Figure 4:
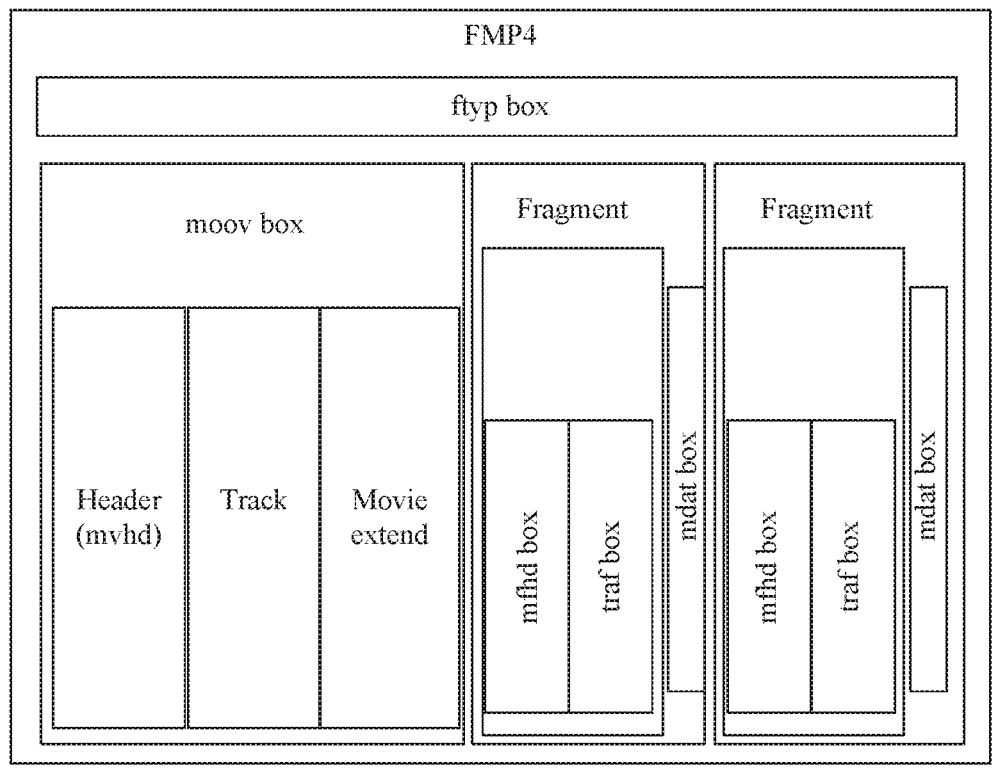
FIG. 4 is an optional schematic view of an encapsulation structure of an FMP4 file in an embodiment of the disclosure.

For instance, when the MP4 file as shown in FIG. 2 is converted to multiple FMP4 files, referring to FIG. 4, which is an optional schematic view of an encapsulation structure of an FMP4 file provided by an embodiment of the disclosure, one MP4 file can be converted to be multiple FMP4 files. Each FMP4 file includes three basic boxes: an moov box, an moof box and an mdat box.

The moov box includes the MP4-leveled moov, which is used for describing all media data of the MP4 file that the FMP4 files derived from, such as the duration, creation time and modification time of the MP4 file.

The moof box stores the fragmented moov, which is configured for describing media data encapsulated in the FMP4 file therein to ensure the media data in the FMP4 file to be able to be decoded.

One moof box and one mdat box constitute one fragment of the fragmented MP4 file. One fragmented MP4 file can include one or more such fragments. The moov encapsulated in each fragment guarantees media data encapsulated in fragments to be decoded independently.

8) A media source extensions (MSE) interface is an interface orienting players embedded in the network, which is interpreted by an interpreter during loading a webpage and achieved by running the frontend programming language such as JavaScript, with a function of providing playing media stream of the media element invoking Hyper Text Markup Language (HTML) to players, such as utilizing the video element and the audio element to perform functions of the video/audio.

9) A streaming media encapsulation format streaming media format is a media file encapsulating media data to be streaming media. The media file is unnecessary to be completely downloaded or additionally transcoded for being decoded and played. In other words, the encapsulation technology originally supports downing and playing at the same time. A typical file of the streaming media encapsulation format streaming media format includes a TS media file fragmentation based on the HTTP Live Streaming (HLS) technique, flash video (FLV) and so on.

10) A non-streaming media encapsulation format streaming media format is an encapsulation technology of decoding and playing after encapsulating media data to be a media file and completely downing the media file. A typical file of the non-streaming media encapsulation format streaming media format includes an MP4 file, a windows media video (WMV) file, an advanced streaming format (ASF) file and so on.

It is necessary to point out that the MP4 file originally fails to play in a form of streaming media, but the technical effect of downing and playing at the same time can be acquired by online transcoding and subsequently delivering the transcoded streaming media to the player, or filling invalid binary data into the blank section of the incompletely downloaded MP4 file such as filling a blank section of an mdat box with invalid binary data when an ftyp box and an moov box are entirely downloaded. In the disclosure, encapsulation formats reject files of playing streaming media originally are defined to be non-streaming media formats.

First, an analysis device of the moov box of an embodiment of the disclosure will be introduced. The analysis device of the moov box can be provided as hardware, software or a combination of hardware and software.

Figure 5:
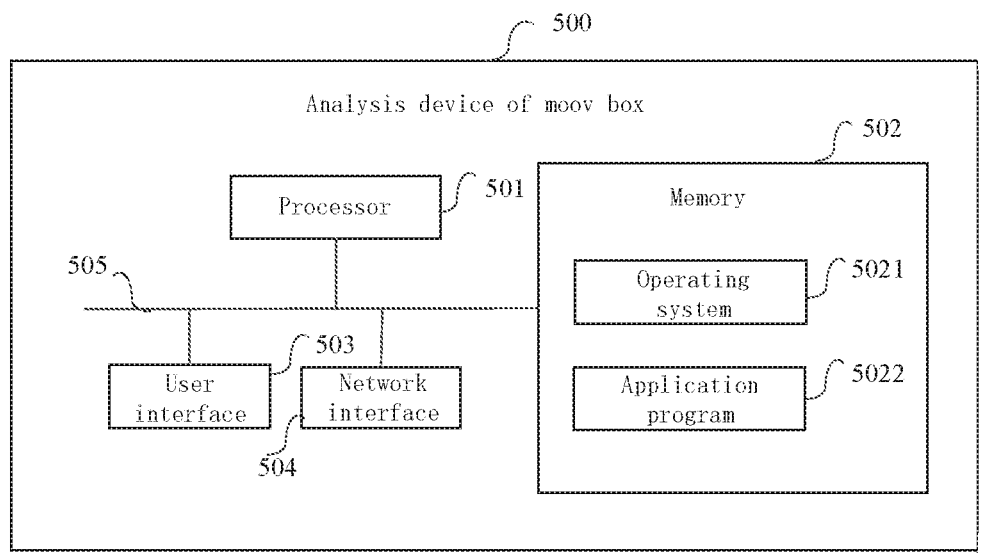
FIG. 5 is an optional compositional schematic view of an analysis device of an moov box of an embodiment of the disclosure.

An embodiment of the combination of hardware and software of the analysis device of the moov box will be illustrated as follows. Referring to FIG. 5, FIG. 5 is an optional schematic view of an analysis device of an moov box in an embodiment of the disclosure. An analysis device of an moov box 500 can be a mobile phone, a computer, a digital broadcasting terminal, a message transmitter-receiver, a game controller, a tablet, a medical facility, a fitness facility, a personal digital assistant with the function of playing videos and so on. The analysis device of the moov box 500 as shown in FIG. 5 includes at least one processor 501, a memory 502, at least one network interface 504 and a user interface 503. Various components in the analysis device of the moov box 500 are coupled together by a bus system 505. Conceivably, the bus system 505 is utilized to connect and communicate the components. Besides the bus, the bus system 505 further includes a power bus, a control bus and a status signal bus. But for the sake of clear illustration, all sorts of buses in FIG. 5 are marked as the bus system 505.

The user interface 503 can include a display, a keyboard, a mouse, a trackball, a click wheel, a key, a button, a touch panel or a touch screen.

Conceivably, the memory 502 can be a volatile memory or a nonvolatile memory, or both. The nonvolatile memory can be a read only memory (ROM), a programmable read-only memory (PROM), an erasable programmable read-only memory (EPROM), an electrically erasable programmable read-only memory (EEPROM); magnetic memory can be a disk memory or a tape memory. The volatile memory can be a random access memory (RAM), which is used as an external cache. The illustration is exemplary, rather than limitation. Many forms of RAMs are available, such as a static random access memory (SRAM), a synchronous static random access memory (SSRAM), a dynamic random access memory (DRAM), a synchronous dynamic random access memory (SDRAM). The memory 502 provided in embodiments of the disclosure is aimed at including aforementioned and other suitable memories.

The memory 502 in an embodiment of the disclosure includes but not limited to a ternary content-addressable memory (TCAM), a static random access memory, which can store media file data obtained from a server to support the operation of the analysis device of the moov box 500. Examples of the data include any computer program run over the analysis device of the moov box 500, such as an operating system 5021, an application program 5022, and various types of media file data information. The operating system 5021 includes a variety of system programs, such as a frame layer, a core library layer, a driver layer, configured for supporting various basic services and handling missions based on hardware. The application program 5022 can include all sorts of application programs, such as a client or an application program with the analysis function of the moov box. Programs with analytical methods of the moov box in embodiments of the disclosure can be included in the application program 5022.

Methods disclosed by embodiments of the disclosure are acquired by the processor 501. The processor 501 can be an integrated circuit chip with abilities to process signals. During the process, the analytical methods of the moov box provided by embodiments of the disclosure can be fulfilled by an integrated logic circuit of hardware or manipulation of software in the processor 501. The processor 501 can be a communication processor, a digital signal processor (DSP), or other programmable logic devices, a discrete gate or a transistor logic device, a discrete hardware component, etc. The processor 501 can implement or perform all methods, steps and logic diagrams provided in embodiments of the disclosure. The communication processor can be a microprocessor or any other conventional processor. Combined with steps of methods provided of embodiments of the disclosure, the result can be processed by hardware decoding processors or mixture of hardware and software in decoding processors. Software modules can be located in a storage medium. The storage medium locates in the memory 502. The processor 501 reads information in the memory 502, and runs the analytical methods of the moov box with the aid of hardware.

In an exemplary embodiment, an embodiment of the disclosure further provides a computer readable storage medium, including the memory 502 of a computer program. The aforementioned computer program can be processed by the processor 501 of the analysis device 500 of the moov box to run the analytical methods of the moov box. The computer readable storage medium can be a memory such as an FRAM, an ROM, a PROM, an EPROM, an EEPROM, a flash memory, a magic memory, a compact disc, or a CD-ROM; or a device including one or more memories above, such as a mobile phone, a computer, a tablet, a personal digital assistant, etc.

The hardware achievement of the analysis device of the moov box will be illustrated below. The analysis device of the moov box in embodiments of the disclosure can be fulfilled by one or more application specific integrated circuit (ASIC), DSP, programmable logic device (PLD), complex programmable logic device (CPLD), field-programmable gate array (FPGA) or other electrical elements, configured for performing the analytical methods of the moov box provided by embodiments of the disclosure.

The software achievement of the analysis device of the moov box will be illustrated below. The analysis device of the moov box in embodiments of the disclosure can be fulfilled by application programs or plug-ins, or a combination of both.

As an example, an application program can be a client specific for analyzing the moov box, or a client with an optical service of the analysis function of the moov box, which will be activated by installing a corresponding plug-in.

As an example, the plug-in can upgrade installation package for application programs and add the analysis function of the moov box in the application programs of media players; or the plug-in can be an element in a webpage of media players, which can be achieved by the frontend language and directly performed by the browser to analyze the moov box and play the media in the webpage.

Figure 6:
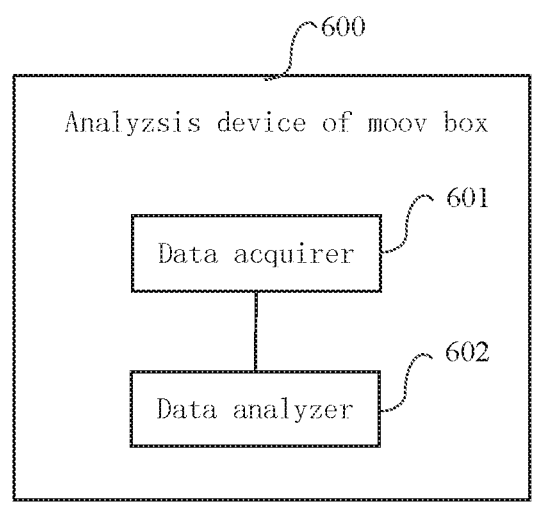
FIG. 6 is an optional compositional schematic view of an analysis device of an moov box of an embodiment of the disclosure.

As an example of hardware embodiment or software embodiment of the analysis device of the moov box, the analysis device of the moov box can provide a series of modules coupled in levels of signals/information/data, which will be illustrated with reference to FIG. 6 as follows. Referring to FIG. 6, FIG. 6 is an optional structural schematic view of an analysis device of an moov box of an embodiment of the disclosure, which shows a series of modules included in the analysis device of the moov box, but the module structure of the analysis device of the moov box is unlimited to that shown in FIG. 6. For instance, modules therein can be further separated or combined according to different functions. The following is the illustration of functions of modules shown in FIG. 6.

Illustration on functions of each module shown in FIG. 6 will be continuously based on FIG. 5 as below.

A data acquirer 601 is disposed to obtain binary data corresponding to the moov box from binary data of the media file according to the location of the moov box in the media file.

A data analyzer 602 is disposed to sequentially analyze binary data with a standard length corresponding to the moov box header in the obtained binary data to obtain a box type of a sub-box in the moov box and a length of box data of the sub-box.

The data analyzer 602 is disposed to invoke a parser of a corresponding type of the sub-box to sequentially analyze binary data in the unresolved data with a corresponding length of the box data to obtain media information represented by the box data.

In some embodiments, the provided analysis device of the moov box can be used in a server corresponding to the application program. The server corresponding to the application program responses to the request from a frontend player to provide binary data in the media file to the frontend. The frontend player includes an HTML5 (H5) player in a webpage loaded by an embedded browser or any application program built-in the browser, and supported by the frontend language such as JavaScript. When the browser loads the webpage with media players, player codes and the webpage elements are downloaded to the browser. As the player is supported by the frontend language, a compiling process will be unnecessary. The browser can directly read and perform the player codes to achieve the function of the player in the webpage, which can fit in a wide range of platforms, resulting in a high efficiency.

In some embodiments, the binary data include binary data in an ftyp box, an moov box and an mdat box to support the frontend to recalculate the new moov of a corresponding fetched media data based on the binary data of the fetched file type, media data among key frames, and the fetched moov.

In some embodiments, the step of recalculating the new moov corresponding to fetched media data based on the fetched moov includes filling the moov in the level of fragmented media files such as the moov box in the FMP4 and data therein, as well as the fragmented-leveled moov in the fragmented media files such as the moof box in the FMP4 and data therein into a corresponding box in an encapsulation structure of the fragmented media files, and one FMP4 file can include one or more fragments.

In some embodiments, the analysis device of the provided moov box can be employed in a terminal device, for instance, which can be a player equipped in a terminal device. The player can be an H5 player in a webpage loaded by an embedded browser or any application program with a built-in browser, and realized by the frontend language such as JavaScript. When the browser loads the webpage with media players, player codes and the webpage elements are downloaded to the browser. As the player is supported by the frontend language, a compiling process will be unnecessary. The browser can directly read and perform the player codes to achieve the function of the player in the webpage, which can fit in a wide range of platforms, resulting in a high efficiency.

In some embodiments, a player equipped with the analysis device of the moov box first requests binary data of the ftyp box and the moov box in the media file from a corresponding server, and analyzes the type of the media file and the media information. Second, the player calculates the time span containing two key frames to be played by combination of the player and the media information, and requests media data—video/audio data—between the two key frames in the mdat box from the server. Finally, the player calculates the moov describing the fetched media data and the new moov containing the moov in the level of fragmented media files as well as the fragment-leveled moov in the fragmented media files, and fills in according to the encapsulation structure of the fragmented media files.

In some embodiments, a file requested by a player equipped with the analysis device of the moov box from a corresponding server is an MP4 file. The moov box of the MP4 file is a nested structure of multiple sub-boxes. In the nested structure, a portion of the sub-boxes are encapsulated with specific binary data, and a portion of the sub-boxes are further encapsulated with other sub-boxes.

According to the encapsulation standard, some bytes in the initial part of the binary data of the obtained moov box depict the box type and the size of the moov box. Therefore, during obtaining binary data of the media file corresponding to the moov box, first, the data with a standard length in the binary data are analyzed byte by byte based on the standard length of the box header in the media file to obtain a box type and a size of the mdat box; second, when the analyzed box type is the moov box, the binary data corresponding to the header of the sub-box of the box data containing numerous sub-boxes in the moov box are continued to be analyzed byte by byte according to the standard length of the box header in the media file.

During analyzing the moov, it is requisite to analyze and process corresponding data according to the encapsulation standard of the MP4 file.

Taking the MP4 file as an example, the standard length of the box header will be illustrated as follows. Initial four bytes of the box header—32 bits—is the length/size of the box, including memory space occupied by the box header and the box data. If the length is 1, it reveals the box will be stored in the subsequent large size field of unit 64 of 8 bits. If the size is 0, it reveals the box is the last box. Four bytes after a byte representing the size of the box header reveal the box type, such as "ftyp", "moov", etc., which depict a specific type of box; if it is "uuid", the box is an extension type. If the type of the box is the universally unique identifier ("uuid"), the following 16 bytes will be used for storing the uuid. And thereafter, it is the box data in the moov box. The moov box includes binary data of numerous boxes. The header of the sub-box is identically subject to the standard length.

In some embodiments, the data analyzer 602 is disposed to compare the box type of the sub-box with a pre-marked box type. The data analyzer 602 is disposed to invoke a parser corresponding to a box type of the sub-box, which analyzes the box data in the sub-box by the parser to achieve the media information represented by the box data. When the box type of the sub-box is determined to be pre-marked to directly encapsulate binary data by comparing, the corresponding box data can be rapidly analyzed, resulting in efficiently enhancing the analysis speed.

In some embodiment, the data analyzer 602 is disposed to compare the box type of the sub-box with the pre-marked box type. The data analyzer 602 is disposed to recursively analyze binary data corresponding to the sub-box according to the standard length of a box header in the media file until a box type of a box encapsulated in the sub-box is pre-marked to be utilized for directly encapsulating binary data. When the box type of the sub-box is determined to be pre-marked to be utilized for continuously encapsulating a box by comparing, as binary data corresponding to the sub-box are recursively analyzed according to the standard length of a box header in the media file, the data analysis can be ensured to be correct.

In some embodiments, the data analyzer 602 is disposed to invoke a parser corresponding to a box type of a box encapsulated in the sub-box. The binary data are analyzed byte by byte. The length of the analyzed binary data and the length of the box data of the box encapsulated in the sub-box are corresponding to obtain media information represented by box data of the box encapsulated in the sub-box. When the box type of the box encapsulated in the sub-box is determined to be pre-marked to be utilized for directly encapsulating the binary data by comparing, as the binary data are analyzed byte by byte, and a length of the analyzed binary data and a length of the box data of the box encapsulated in the sub-box are corresponding, accuracy of data analysis can be efficiently improved.

In some embodiments, the device further includes a data recorder (not shown in figures) disposed to record the analyzed sub-box in the invoked parser. An instance of the recorded sub-box is disposed in a property of the sub-box. The property of the sub-box includes a box containing the sub-box, configured for describing a nested relation between the sub-box and the box containing the sub-box. The nested relation between the sub-box and the box containing the sub-box can be precisely described by recording the analyzed sub-box in the invoked parser.

In some embodiments, the device further includes a data memory (not shown in figures) disposed to build an object according to the nested relation between the sub-box and the box containing the sub-box, as well as the nested relation between the sub-box and the encapsulated box. The object built correspondingly to the sub-box stores an array containing media information. The stored media information is depicted by box data of the sub-box. The process of analyzing the nested structure can be synchronized with that of directly encapsulating the media information stored in the binary data sub-box by the manner of object.

In some embodiments, when a parser of a type corresponding to the box type of the sub-box is failed to be invoked, the data analyzer 602 is further disposed to neglect to analyze binary data corresponding to the sub-box. Specifically, neglecting to analyze binary data corresponding to the sub-box includes two situations. First, when the sub-box unable to be analyzed is not a sub-box arranged in the last among all the sub-boxes, after omitting the binary data corresponding to the sub-box, it is requisite to jump to a section corresponding to the next sub-box in the binary data for continuously analyzing to complete the entire analysis process. Second, when the sub-box unable to be analyzed is the sub-box arranged in the last among all the sub-boxes, the only neglected binary data can be ones corresponding to the sub-box. Situations of the sub-box unable to be analyzed include that the parser corresponding to the sub-box is missing, or the parser corresponding to the sub-box is unable to be invoked. The box unable to be analyzed is treated by neglecting to analyze the binary data corresponding to the sub-box, and jumping to a section corresponding to a next sub-box in the binary data for continuous analysis according to the length of the sub-box, which can ensure compatibility and stability in box analysis and prevent the pause during the analysis process caused by inability in analysis or errors appeared in the analysis process. Even if the media file contains a customized box and thereby failing to be analyzed, the technical solution provided by the embodiment of the disclosure will not lead to display error messages in the analysis process, which prevents the subsequent analysis from going on, resulting in the media file to be analyzed to the maximal extent.

The data analyzer is disposed to skip to a section corresponding to a next sub-box in the binary box for continuous analysis. When the sub-box unable to be analyzed is arranged to be the last sub-box among all the sub-boxes, the only binary data to be neglected can be the binary data corresponding to the specific sub-box. Conversely, when the sub-box unable to be analyzed is not arranged to be the last sub-box among all the sub-boxes, after neglecting the binary data corresponding to the sub-box, it is necessary to jump to a section corresponding to the next sub-box in the binary data for continuous analysis, so as to achieve the entire analysis process. The box unable to be analyzed is treated by neglecting to analyze the binary data corresponding to the sub-box, and jumping to a section corresponding to a next sub-box in the binary data for continuous analysis according to the length of the sub-box, which can ensure compatibility and stability in box analysis and prevent the pause during the analysis process caused by inability in analysis or errors appeared in the analysis process. Even if the media file contains a customized box and thereby failing to be analyzed, the technical solution provided by the embodiment of the disclosure will not lead to display error messages in the analysis process, which prevents the subsequent analysis from going on, resulting in the media file to be analyzed to the maximal extent.

In some embodiments, as the analyzed moov box possibly contains destroyed data, the technical solution shown in the embodiment will be employed, which neglects to analyze some sub-boxes in the manner of jumping, resulting in accelerating the data analysis. With respect to the destroyed data in the original data, it is avoided by continuously analyzing undestroyed data by skipping in the sub-box. The failure in data analysis due to the destroyed data can be prevented.

In some embodiments, nested relations in the box include: a nested relation between a sub-box and a super-box, a nested relation between a sub-box and a sub-box of the sub-box. Conceivably, when the box type of the sub-box is configured for directly encapsulating binary data, the latter nested relation will be absent.

In some embodiments, a process of a player receiving media data of a given period will be illustrated. When the player plays a video file or a media file of a track, it is compulsory for the player to analyze the data stream correctly. After some time, corresponding media data can be obtained, and the media data should be decoded independently.

The analysis method of the moov box of the embodiment of the disclosure will be illustrated with reference to the analysis device of the moov device provided by embodiments of the disclosure. Taking an MP4 file, a typical media file, as an example, conceivably, the conversion manner aimed at the MP4 file recorded based on below can easily be applied to other non-streaming media formats.

The analysis method of the moov box provided by the embodiment of the disclosure can be applied to frontend players. The players include but not limited to an HTML5 (H5) player in a webpage loaded by an embedded browser, which is supported by the frontend language such as JavaScript. When the browser loads the webpage with media players, player codes and the webpage elements are downloaded to the browser. As the player is supported by the frontend language, a compiling process will be unnecessary. The browser can directly read and perform the player codes to achieve the function of the player in the webpage, which can fit in a wide range of platforms, resulting in a high efficiency.

Figure 7:
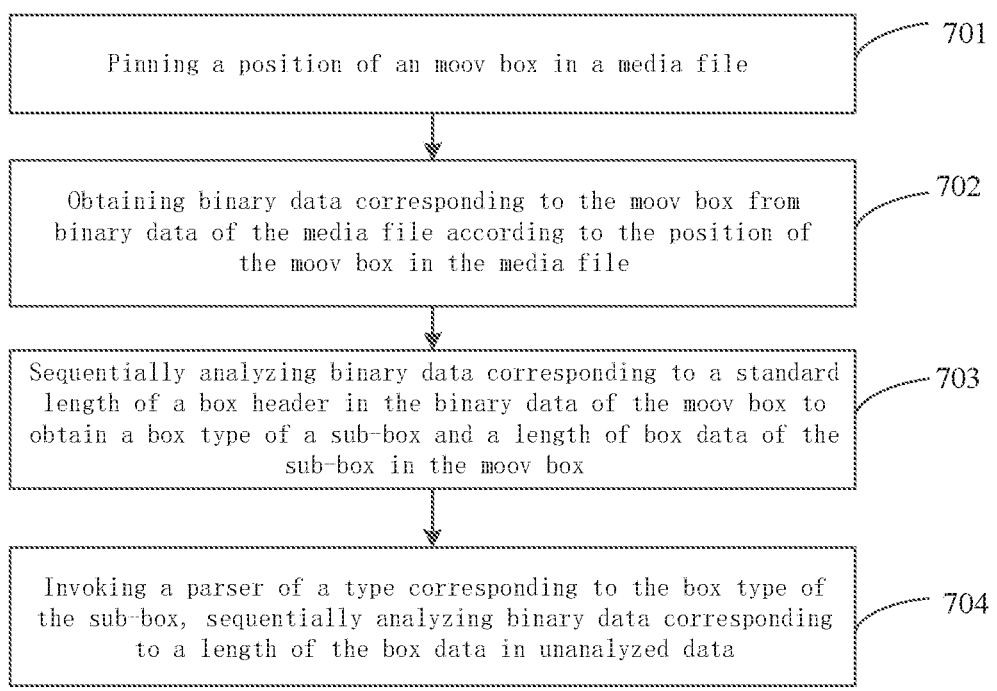
FIG. 7 is an optional schematic flowchart of an analysis method of an moov box provided by an embodiment of the disclosure.

In some embodiments, the player needs to analyze the moov of the media file to obtain media information, and media data in the media file will be decoded precisely according to the media information. Referring to FIG. 7, FIG. 7 is an optional schematic flowchart of an analysis method of an moov box provided by an embodiment of the disclosure. The illustration will be combined with steps shown in FIG. 7.

Step 701, a position of an moov box in a media file is pinned.

In an embodiment, binary data subject to the box header standard are read from binary data of the media file. The offset and the size of moov box in the media file are determined according to the type and the length of the box identified from the read binary data.

For instance, regarding to binary data of the media file, the binary data starting from the zero bit correspond to the ftyp box. According to the standard length of the box header, the starting point of binary data of the media file is read; binary data subject to the standard length of the box header are read; and the type and the length of the box located after the ftyp box in the media file can be determined by analyzing the read binary data.

If the analyzed type is the ftyp box, the length (size) of the moov box can be accordingly analyzed. The offset of the moov box is the length of the ftyp box.

If the analyzed type is the mdat box, the lengths of the mdat box and the ftyp box act as the offset, binary data subject to the standard length of the box header are continuously read to analyze the length (size) of the moov box. And the length of the moov box is the sum of the length of the ftyp box and the length of the mdat box.

Except the starting box in the media file is the ftyp box, the encapsulation of other boxes thereafter is disordered. The position of the ftyp box can be determined precisely and efficiently by the aforementioned analysis method no matter the encapsulation sequence of boxes in the media file is the ftyp box, the moov box and the mdat box, or is the ftyp box, the mdat box and the moov box.

Step 702, according to the position of the moov box in the media file, binary data corresponding to the moov box are obtained from binary data in the media file.

Since the position of the moov box in the media file can be represented by the offset and the size, binary data are read from the position corresponding to the offset in the media file until the length of the read binary data subject to the size of the moov box, which can read binary data corresponding to the moov box.

Step 703, binary data corresponding to the standard length of the box header in binary data of the moov box are sequentially analyzed to obtain the box type of the sub-box and the length of box data of the sub-box in the moov box.

In one embodiment, aiming at the situation of multiple sub-boxes are nested in the moov box, the offset of each read binary data is the sum of recognized lengths of sub-boxes. The length of read binary data subjects to the standard length of the box header, in order to analyze the type and the length of the presently processed sub-box.

For instance, at the first time, binary data are read from the zero bit of binary data of the moov box, and the length of read binary data conforms to the standard length of the box header, so as to analyze the type and the length of the first sub-box; at the second time, taking the firstly read length of the sub-box as the offset, the binary data start to be read, and the length of read binary data conforms to the standard length of the box header, so as to achieve the type and the length of the second sub-box.

The binary data read according to the manner shown in the embodiment will not backspace due to overread, or reread due to less read, resulting in better efficiency and accuracy of analysis.

Step 704, a parser of a type corresponding to the box type of the sub-box is invoked, and binary data in unanalyzed data corresponding to the length of box data are sequentially analyzed to obtain media information represented by box data.

In one embodiment, a typical box type nested in the moov box is pre-marked to distinguish the box to directly encapsulate binary data or further encapsulate a box. For instance, marks such as the mvhd box, the audio track box and the video track box shown in FIG. 2 are labeled to further encapsulating a box; marks such as the stts box, the stsd box shown in FIG. 2 are labeled to direct encapsulate binary data.

The box types marked to direct encapsulate binary data are disposed with parsers respectively corresponding to each of the box types. The parsers are configured for obtaining represented media information by analyzing binary data; in the step 704, when the box type of the sub-box analyzed in the step 703 and the pre-marked box type are compared, two situations below can be involved.

Situation one, when the box type of the sub-box is pre-marked for directly encapsulating binary data by comparison, a parser corresponding to the box type of the sub-box will be invoked, and box data in the sub-box is analyzed by the parser to obtain the media information represented by the box data.

Situation two, when the box type of the sub-box is pre-marked for continuously encapsulating a box by comparison, according to the standard length of the box header in the media file, binary data corresponding to the sub-box are recursively analyzed until the box type of the box encapsulated in the sub-box is pre-marked to direct encapsulate binary data. A parser corresponding to the box type of the box encapsulated in the sub-box is invoked to analyze the binary data byte by byte. The length of the analyzed binary data and the length of box data of the box encapsulated in the sub-box are corresponding to obtain media information represented by box data of the box encapsulated in the sub-box.

In one embodiment, the manner of recording media information during analyzing the moov box will be illustrated. When binary data corresponding to the standard length of the box header in binary data of the moov box are sequentially analyzed to obtain the box type of sub-box in the moov box, an object will be built according to the nested relation between the sub-box and the box containing the sub-box, and the nested relation between the sub-box and the box encapsulated therein. When the box type of the sub-box is pre-marked to direct encapsulate binary data, the object built correspondingly to the sub-box stores an array containing media information. The stored media information is represented by box data of the sub-box.

For instance, in FIG. 2, when the type of the analyzed sub-box is an stts box, as the stts box is pre-marked to direct encapsulate binary data, an object built correspondingly to the stts box stores the array containing media information. The media information herein is time information represented by box data of the stts box.

In one embodiment, the manner of recording the nested relation between sub-boxes during analyzing the moov box will be illustrated. When binary data corresponding to the standard length of the box header in binary data of the moov box are sequentially analyzed to obtain the box type of sub-box in the moov box, if the box type is pre-marked to direct encapsulate binary data, the analyzed sub-box will be recorded in the invoked parser; an instance of the recorded sub-box is disposed in the sub-box property, the sub-box property includes a box containing the sub-box, configured for describing the nested relation between the sub-box and the box containing the sub-box.

For instance, in FIG. 2, when the type of the analyzed sub-box is an stsd box, as the stsd box is pre-marked to direct encapsulate binary data, the stsd box will be recorded in a parser corresponding to the stsd box, and the instance of the stsd box is disposed in the stbl box sub-box property, and so on, the sub-box property of the stsd box finally records numerous sub-boxes nested in the stbl box such as the stsd box, the stts box, the stsc box, etc.

In one embodiment, the box type of the sub-box is not pre-marked, or is pre-marked to directly encapsulate binary data without invoking a parser of corresponding type, binary data corresponding to the sub-box is neglected to be analyzed, and according to the length of the sub-box, it is skipped to a section corresponding to the next sub-box in the binary data for continuous analysis. When the sub-box unable to be analyzed is arranged to be the last sub-box among all the sub-boxes, the only binary data to be neglected can be the binary data corresponding to the specific sub-box. Conversely, when the sub-box unable to be analyzed is not arranged to be the last sub-box among all the sub-boxes, after neglecting the binary data corresponding to the sub-box, it is necessary to jump to a section corresponding to the next sub-box in the binary data for continuous analysis, so as to achieve the entire analysis process. The box unable to be analyzed is treated by neglecting to analyze the binary data corresponding to the sub-box, and jumping to a section corresponding to a next sub-box in the binary data for continuous analysis according to the length of the sub-box, which can ensure compatibility and stability in box analysis and prevent the pause during the analysis process caused by inability in analysis or errors appeared in the analysis process. Even if the media file contains a customized box and thereby failing to be analyzed, the technical solution provided by the embodiment of the disclosure will not lead to display error messages in the analysis process, which prevents the subsequent analysis from going on, resulting in the media file to be analyzed to the maximal extent.

In some embodiments, as the analyzed moov box possibly contains destroyed data, the technical solution shown in the embodiment will be employed, which neglects to analyze some sub-boxes in the manner of jumping, resulting in accelerating the data analysis. With respect to the destroyed data in the original data, it is avoided by continuously analyzing undestroyed data by skipping in the sub-box. The failure in data analysis due to the destroyed data can be prevented.

Furthermore, as sources of the media file are various, self-defined box type may appear in the media file. The overall analysis schedule will not be interrupted by the skipping manners recorded and employed in some embodiments. Meanwhile, the parser is disposed, when the box type of the moov box is changed, the latest moov box can be rapidly analyzed by adding, deleting or modifying a parser of a corresponding type for compatibility, which can enhance the flexibility of analysis, as well as reducing usage costs.

In some embodiments, the analyzed sub-box can further be recorded in the invoked parser; an instance of the recorded sub-box is disposed in a property of the sub-box. The property of the sub-box includes a box containing the sub-box, configured for describing a nested relation between the sub-box and the box containing the sub-box. The analyzed sub-box can be recorded in the invoked parser by the technical solution shown in the embodiment. The parser invoked frequently can be packed to be a fundamental analyzer by analyzing recorded information to judge the frequency of invoking the parser, so as to accelerate the data analysis.

In some embodiments, an object is built according to the nested relation between the sub-box and the box containing the sub-box, and the nested relation between the sub-box and the box encapsulated therein, and when a box type of the sub-box is pre-marked to be used for directly encapsulating binary data, the object built correspondingly to the sub-box stores an array containing media information. The stored media information is represented by box data of the sub-box.

In some embodiments, when a parser with a type corresponding to the box type of the sub-box is not invoked, binary data corresponding to the sub-box are neglected to be analyzed. The binary data corresponding to the uncalled parser are neglected by the technical solution shown in the embodiment, which can efficiently accelerate to analyze voluminous data.

In some embodiments, nested relations in the box include: a nested relation between a sub-box and a super-box, a nested relation between a sub-box and a sub-box of the sub-box. When the box type of the sub-box is configured for directly encapsulating binary data, the latter nested relation will be absent.

In some embodiments, it is possible to skip to the section corresponding to the next sub-box in binary data for continuous analysis. The data analysis can be accelerated by skipping in the sub-box shown in the technical solution of the embodiment. Meanwhile, regarding the damaged data to be analyzed in the original data, the undamaged data can be analyzed by skipping in the sub-box. Moreover, with respect to the sub-box without marks failing in invoking a parser, data in the corresponding object is blank, but the instance of the sub-box still needs to be disposed in the sub-box property of the box therein for forming a complete nested relation.

Figure 8:
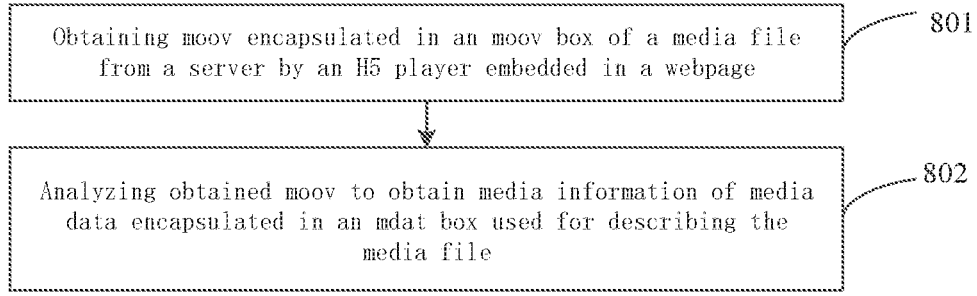
FIG. 8 is an optional schematic flowchart of analyzing from an moov box to obtain media information provided by an embodiment of the disclosure.

Taking the MP4 file analyzed by an H5 player embedded in a webpage as an example, with reference to the analysis device of the moov box provided by the embodiment of the disclosure, referring to FIG. 8, FIG. 8 is an optional schematic flowchart of an analysis method of an moov box provided by an embodiment of the disclosure. The illustration will be combined with steps shown in FIG. 8.

Step 801, the moov encapsulated in an moov box of a media file is obtained from a server by an H5 player embedded in a webpage.

In some embodiments, the player can obtain the moov encapsulated in the moov box of the media file by following manners. The player receives binary data starting from the zero bit and subject to a predetermined size feedback from the server by sending a request with the given offset and size to the server over the network; the moov in the moov box is identified from the binary data returned from the server.

The given size can be achieved by statistic according to the ftyp box of the media file and the size of the moov box, which can lead to the given size to cover the sum of the ftyp box of the media file of a give ratio such as the whole and the size of the moov box. When the encapsulation structure of the media file is sequentially encapsulated ftyp box, moov box and the mdat box, the moov encapsulated in the intact moov box can be obtained by one request, which can reduce the occupation of connection during network transmission, further preventing the delay response of the non-media broadcast missions in the webpage due to inability to use connection caused by connection occupation.

The moov encapsulated in the moov box obtained by the player is binary data encapsulated in the moov box in the MP4 file. When the encapsulation structure of the MP4 file is sequentially encapsulated ftyp box, moov box and mdat box, the given size can be obtained by statistic according to sizes of the ftyp box and the moov box of the MP4 file, which can lead to the given size to cover the sum of binary data of the ftyp box and the moov box of the media file of a give ratio such as the whole, further ensuring to receive intact binary data in the moov box from the server by one request in most cases.

In one embodiment, in binary data requested by the player from the server by the given offset and size, a fragment of binary data from the zero bit correspond to the ftyp box. The player obtains the size of the ftyp box by reading the box header, and obtains the type and the size of the next box by reading the second box header. When the type of the second box is the moov box and the size of the returned binary data is no less than the sum of the size of the ftyp box and the size of the moov box, it indicates that binary data requested from the server by the given offset and the size include the moov encapsulated in the moov box; when the type of the second box is the moov box and the size of the returned binary data is less than the sum of the size of the ftyp box and the size of the moov box, it indicates that binary data requested from the server by the given offset and size do not include the moov encapsulated in the moov box. When the binary data requested by the player from the server by the given offset and size do not include the moov in the intact moov box, the player needs to read the size of the box from the binary data returned from the server, and calculate the offset and the size of the moov box according to the header of the moov box, and carry the calculated offset and size in the request to demand the moov from the server over the network. The server reads binary data from the calculated offset in the media file responding to the request, and returns data to the player. The read binary data subject to the calculated size.

For instance, the player reading the size of the box from the binary data returned from the server and calculating the offset and the size of the moov box according to the header of the moov box involves following two conditions.

The first condition is when the type read from the rest binary data (namely, other data than binary data of the ftyp box in the returned binary data) is the moov box, and the size of the rest binary data is less than the size of the moov box, a difference value between the size of the moov box and the size of the size of the rest binary data will be calculated as a new size for the second request, and the sum of the offset and the size of the first request is regarded as the new offset, which are utilized for secondly requesting binary data from the server.

The second condition is when the type of the box read from the rest binary data is the mdat box, the sum of the size of the mdat box and the size of the ftyp box will be calculated to be the new offset of the second request, and the given size that can cover an empirical value of the size of the moov box requests the binary data from the server for the second time.

Taking the MP4 file representing a media file as an example, requested data from the server to the player by the given offset and size do not include the whole binary data of the moov box. Therefore, the player needs to read the type and the size of the box from the returned binary data of the server to determine the offset and the size in the moov box of the MP4 file.

The starting byte of binary data of the MP4 file always corresponds to the ftyp box. The binary data of the ftyp box are identified from the returned binary data, and the length thereof can be obtained by the header of the ftyp box. In the rest binary data, the binary data of the next box can be read according to the standard length of the header; and the box type is represented by the header, which can include following circumstances.

First, when the type of the box read from the rest binary data (namely data other than binary data of the ftyp box in the returned binary data) is the moov box, and the size of the rest binary data is no less than the size of the moov box, according to the given offset and size, moov data starting from the offset of the moov box in the MP4 file and in accordance with the size of the moov box in the MP4 file will be received from the server.

Second, when the type of the box read from the rest binary data is the moov box, and the size of the rest binary data is less than the size of the moov box, a difference value of the size of the moov box and the size of the rest binary data will be calculated to be the new size for the second request, and the sum of the offset and the size of the first request is regarded as the new offset for the second request; the server then receives the request on binary data for the second time.

Third, when the type of the box read from the rest binary data is the mdat box, the sum of the size of the mdat box and the size of the ftyp box will be calculated to be the new offset for the second request, along with the given size, and the server will receives the request on binary data for the second time.

As a result, no matter what encapsulation structure of the media file is, or no matter what the encapsulation sequence of the ftyp box, the moov box and the mdat box in the media file is, it is guaranteed that the moov in the moov box can be obtained from the server by the player within at most two requests, which can improve the acquisition efficiency of the moov.

For instance, with respect to the MP4 file, according to the encapsulation standard of the MP4 file, a portion of the binary data from the zero bit of the binary data returned from the server are corresponding to the ftyp box; and according to the encapsulation standard of the header of the box, the size/length of the ftyp box and the size of the entire MP4 file can be read from the header of ftyp box; the size of the ftyp box is supposed to be a (unit is bit), the type and the size of subsequent boxes can be obtained by reading the header information of subsequent boxes from a+1. If the next one after the ftyp box is read to be the moov box, and the size of the rest binary data (the given size—the size of the ftyp box) is larger than the size of the moov box, it means the whole binary data of the moov box are returned; the moov in the moov box can be extracted from the rest binary data according to the offset and the size of the moov box.

Step 802, the obtained moov is analyzed to obtain media information used for describing media data encapsulated in an mdat box of a media file.

After obtaining the moov encapsulated in the moov box from the server, the player analyzes the nested relation of sub-boxes in the moov box, and reads binary data in each of the sub-boxes according to the nested relation of the sub-boxes; the media information of the media data represented by each sub-box is analyzed from the read binary data. In practice, the media information can include information such as the offset, the size, the decoding time of video frames and/or audio frames in the media file.

Taking the MP4 file representing the media file as an example, referring to FIG. 2, it can be known that the moov box encapsulates the mvhd box and the track box. Information such as the creation time, the modification time, the time scale, the total time, the default volume of the MP4 file can be obtained; the moov box includes multiple track boxes, which record specific description information of each media track. For instance, the video track box nests multiple sub-boxes at numerous levels, and based on the nest structure of the video track box, video frame information and the corresponding image information can be achieved by analyzing corresponding binary data.

In one embodiment, the player can analyze the obtained moov by following manners to achieve the media information. The binary data in the moov box corresponding to the standard length of the box header are sequentially analyzed to obtain the box type of the sub-box in the moov box and the length of the box data of the sub-box; a parser of a type corresponding to a box type of the sub-box is invoked, and data corresponding to the length of box data in the unanalyzed data are sequentially analyzed to obtain media information represented by the box data.

Aiming at the situation of multiple sub-boxes nested in the moov box, the offset of the binary data read by the player each time is the sum of the lengths of recognized sub-boxes. The length of the read binary data subjects to the standard length of the box header, which can analyze the type and the length of the currently processed sub-box.

For instance, the first read is started from reading binary data of the zero bit of the binary data of the moov box, and the length of the read binary data subjects to the standard length of the box header, which can obtain the type and the length of the first sub-box by analysis; during the second read, the firstly read length of the sub-box acts as the offset for starting to read the binary data, and the length of the read binary data subjects to the standard length of the box header, which can obtain the type and the length of the second sub-box by analysis.

The binary data read according to the aforementioned manners will not backspace due to overread, or reread due to less read, which result in guaranteed efficiency and accuracy of analysis.

In one embodiment, a typical box type nested in the moov box is pre-marked to distinguish the box to directly encapsulate binary data or further encapsulate a box. For instance, marks such as the mvhd box, the audio track box and the video track box shown in FIG. 2 are labeled to further encapsulating a box; marks such as the stts box, the stsd box shown in FIG. 2 are labeled to direct encapsulate binary data.

The box types marked to direct encapsulate binary data are disposed with parsers respectively corresponding to each of the box types. The parsers are configured for obtaining represented media information by analyzing binary data; comparing the box type of analyzed sub-boxes and the pre-marked box types involves following two situations.

The first situation is when the box type of the sub-box is compared to be pre-marked to be used for directly encapsulating binary data, a parser corresponding to the box type of the sub-box will be invoked. The box data in the sub-box are analyzed by the parser to obtain the media information represented by the box data.

The second situation is when the box type of the sub-box is pre-marked for continuously encapsulating a box by comparison, according to the standard length of the box header in the media file, binary data corresponding to the sub-box are recursively analyzed until the box type of the box encapsulated in the sub-box is pre-marked to be used for directly encapsulating binary data. A parser corresponding to the box type of the box encapsulated in the sub-box is invoked to analyze the binary data byte by byte. The length of the analyzed binary data and the length of box data of the box encapsulated in the sub-box are corresponding to obtain media information represented by box data of the box encapsulated in the sub-box.

In one embodiment, the manner of recording media information during analyzing the moov box will be illustrated. When binary data corresponding to the standard length of the box header in binary data of the moov box are sequentially analyzed to obtain the box type of sub-box in the moov box, an object will be built according to the nested relation between the sub-box and the box containing the sub-box, and the nested relation between the sub-box and the box encapsulated therein. When the box type of the sub-box is pre-marked to direct encapsulate binary data, the object built correspondingly to the sub-box stores an array containing media information. The stored media information is represented by box data of the sub-box.

For instance, in FIG. 2, when the type of the analyzed sub-box is a stts box, as the stts box is pre-marked to direct encapsulate binary data, an object built correspondingly to the stts box stores the array containing media information. The media information herein is time information represented by box data of the stts box.

In one embodiment, the manner of recording the nested relation between sub-boxes during analyzing the moov box will be illustrated. When binary data corresponding to the standard length of the box header in binary data of the moov box are sequentially analyzed to obtain the box type of sub-box in the moov box, if the box type is pre-marked to direct encapsulate binary data, the analyzed sub-box will be recorded in the invoked parser; an instance of the recorded sub-box is disposed in the sub-box property, the sub-box property includes a box containing the sub-box, configured for describing the nested relation between the sub-box and the box containing the sub-box.

For instance, in FIG. 2, when the type of the analyzed sub-box is an stsd box, as the stsd box is pre-marked to direct encapsulate binary data, the stsd box will be recorded in a parser corresponding to the stsd box, and the instance of the stsd box is disposed in the stbl box sub-box property, and so on, the sub-box property of the stsd box finally records numerous sub-boxes nested in the stbl box such as the stsd box, the stts box, the stsc box, etc.

In one embodiment, the box type of the sub-box is not pre-marked, or is pre-marked to directly encapsulate binary data without invoking a parser of corresponding type, binary data corresponding to the sub-box is neglected to be analyzed, and according to the length of the sub-box, it is skipped to a section corresponding to the next sub-box in the binary data for continuous analysis.

In fact, self-defined box type may appear in the media file. The overall analysis schedule will not be interrupted by the skipping manners. Meanwhile, the parser is disposed, when the box type of the moov box is changed, the latest moov box can be rapidly analyzed by adding, deleting or modifying a parser of a corresponding type for compatibility, which can own the characteristic of flexible and rapid upgrade.

Figure 10:
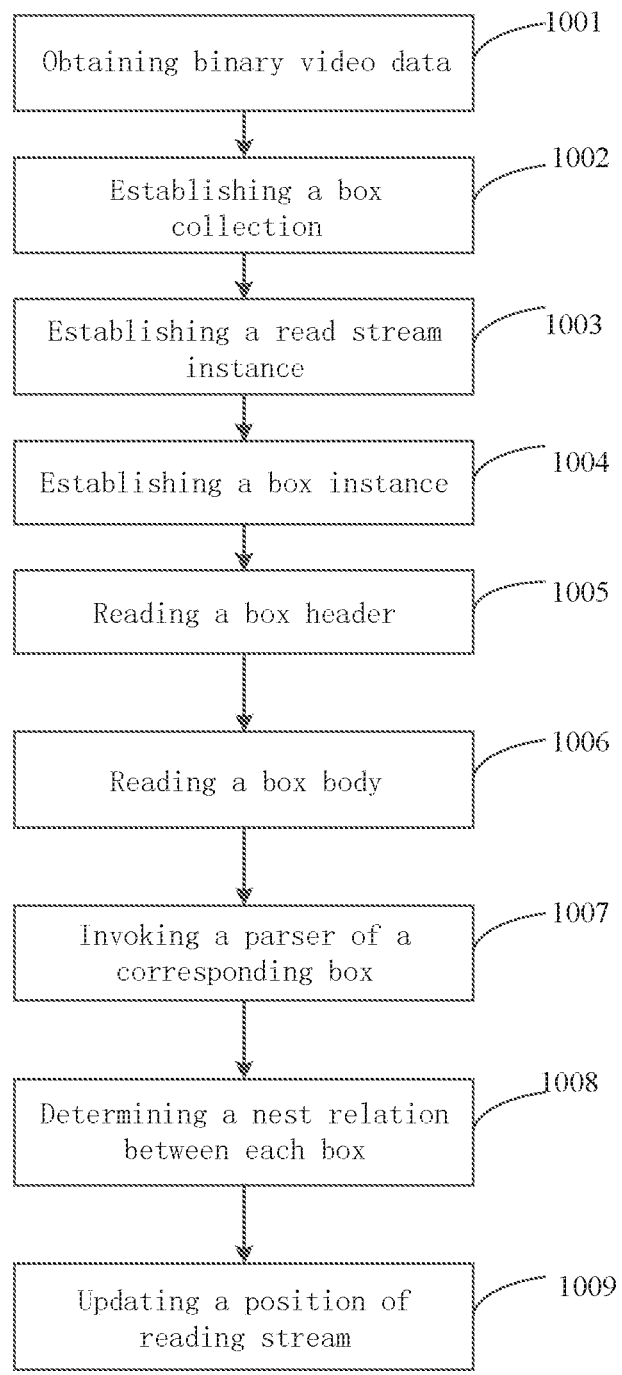
FIG. 10 is an optional schematic flowchart of an analysis method of an moov box provided by an embodiment of the disclosure.

In accordance with the analysis device of the moov box provided by the embodiment of the disclosure, taking the H5 player embedded in a webpage analyzing the MP4 file as an example, referring to FIG. 10, FIG. 10 is an optional flowchart of an analysis method of an moov box provided by an embodiment of the disclosure. The illustration will be combined with steps shown in FIG. 10.

Step 1001, binary video data are obtained.

Since the position of the moov box in the media file can be represented by the offset and the size, binary data are read from the position corresponding to the offset in the media file until the length of the read binary data subject to the size of the moov box, which can read binary data corresponding to the moov box.

Step 1002, a box collection is established.

The binary video data can be marked by the step 1002 for invoking a corresponding parser.

Figure 9:
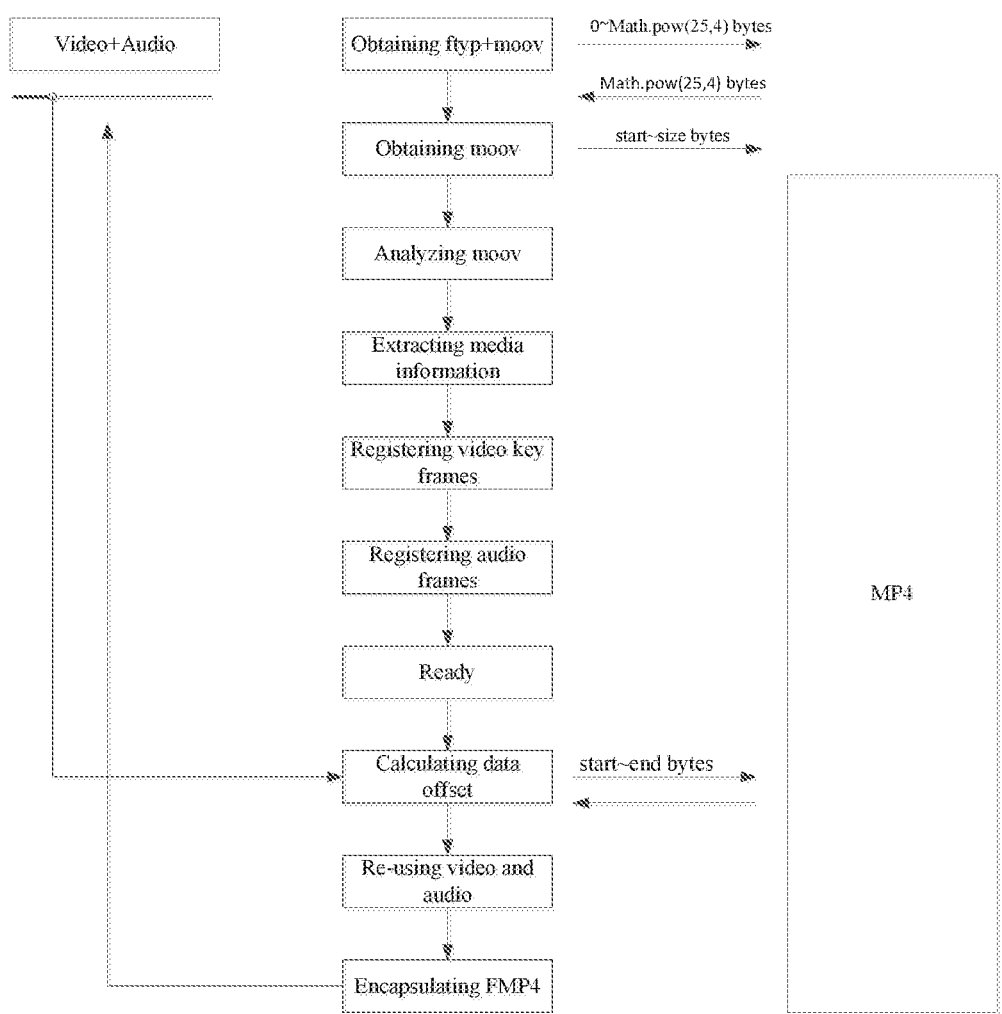
FIG. 9 is an optional schematic flowchart of an analysis method of an moov box provided by an embodiment of the disclosure.

The player obtains binary data starting from zero bit and subjecting to a given size in the MP4 file by sending data with the given offset and size to the server. The encapsulation structure of the MP4 file includes sequentially encapsulated ftyp box, moov box and mdat box. The given size can be achieved by statistic of sizes of the ftyp box and the moov box in the MP4 file, which can lead to the given size to cover the sum of the ftyp box and the moov box of the media file of a give ratio such as the whole, so as to ensure to request the intact binary data of the moov box from the server just for once. Referring to FIG. 9, the offset given by the player request is 0 bit, and the given size is binary data of Math.pow(25,4) bytes. The moov data can be obtained from the binary data returned from the server. If the intact moov data are failed to be achieved by one request, the offset (start in FIG. 9) and the size (start-size) will be recalculated for a second request.

Step 1003, a read stream instance is established.

Step 1004, a box instance is established.

Step 1005, a box header is read.

Information such as the type and the length of the box can be obtained by analyzing the box header.

Step 1006, a box body is read.

Step 1007, a parser of a corresponding box is invoked.

The analysis of the moov box in the box can employ the following manner.

The binary data in the moov box corresponding to the standard length of the box header are sequentially analyzed to obtain the box type of the sub-box in the moov box and the length of the box data of the sub-box; a parser of a type corresponding to a box type of the sub-box is invoked, and data corresponding to the length of box data in the unanalyzed data are sequentially analyzed to obtain media information represented by the box data.

Aiming at the situation of multiple sub-boxes nested in the moov box, the offset of the binary data read by the player each time is the sum of the lengths of recognized sub-boxes. The length of the read binary data subjects to the standard length of the box header, which can analyze the type and the length of the currently processed sub-box.

For instance, the first read is started from reading binary data of the zero bit of the binary data of the moov box, and the length of the read binary data subjects to the standard length of the box header, which can obtain the type and the length of the first sub-box by analysis; during the second read, the firstly read length of the sub-box acts as the offset for starting to read the binary data, and the length of the read binary data subjects to the standard length of the box header, which can obtain the type and the length of the second sub-box by analysis.

The binary data read according to the aforementioned manners will not backspace due to overread, or reread due to less read, which result in guaranteed efficiency and accuracy of analysis.

Step 1008, the nested relation between each of the boxes is determined.

In one embodiment, the manner of recording the nested relation between sub-boxes during analyzing the moov box will be illustrated. When binary data corresponding to the standard length of the box header in binary data of the moov box are sequentially analyzed to obtain the box type of sub-box in the moov box, if the box type is pre-marked to direct encapsulate binary data, the analyzed sub-box will be recorded in the invoked parser; an instance of the recorded sub-box is disposed in the sub-box property, the sub-box property includes a box containing the sub-box, configured for describing the nested relation between the sub-box and the box containing the sub-box.

For instance, in FIG. 2, when the type of the analyzed sub-box is an stsd box, as the stsd box is pre-marked to direct encapsulate binary data, the stsd box will be recorded in a parser corresponding to the stsd box, and the instance of the stsd box is disposed in the stbl box sub-box property, and so on, the sub-box property of the stsd box finally records numerous sub-boxes nested in the stbl box such as the stsd box, the stts box, the stsc box, etc.

Step 1009, a position of reading stream is updated.

The analysis and marks of the nested relation between the sub-box and the box containing thereof, and the nested relation between the sub-box and the box encapsulated therein can be implemented by steps 1008 and 1009.

The process shown in FIG. 10 depicts the analysis of the obtained binary video data. Relevant boxes in the obtained binary video data have the nested relation between the sub-box and the box containing the sub-box, and the nested relation between the sub-box and the box encapsulated therein.

Figure 11:
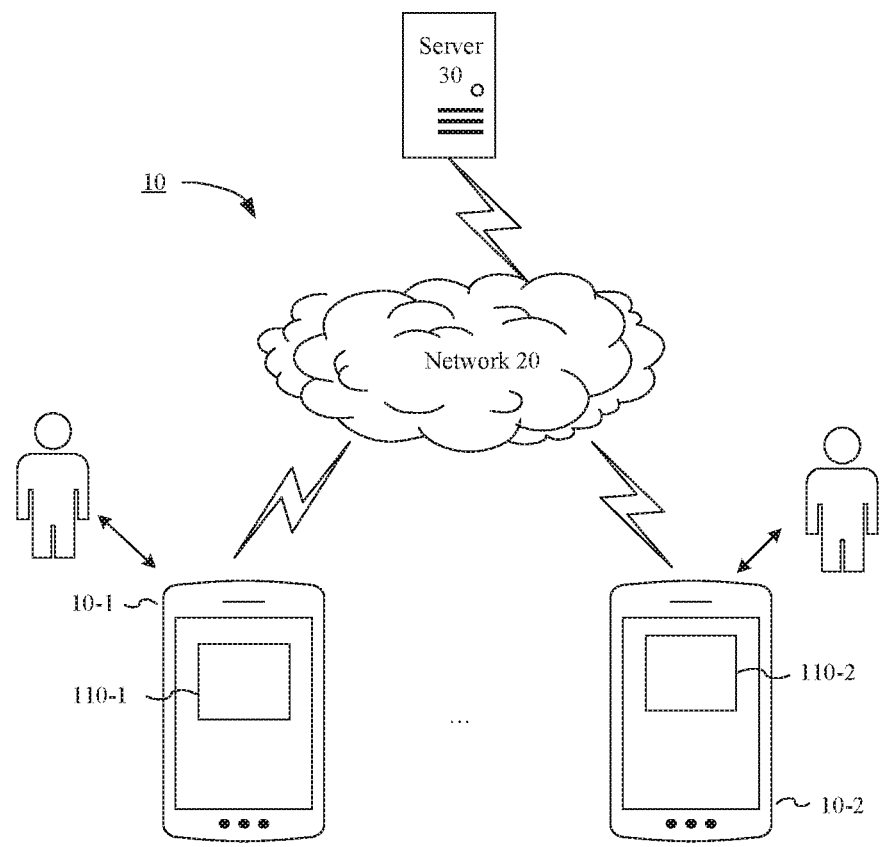
FIG. 11 is an optional schematic view of a usage scenario of an analysis method of an moov box provided by an embodiment of the disclosure.

FIG. 11 is an optional schematic view of a usage scenario of an analysis method of an moov box provided by an embodiment of the disclosure. Referring to FIG. 11, the analysis device of the moov box provided by the embodiment of the disclosure can be a subscriber terminal 10. In order to provide an exemplary application, the subscriber terminal 10 (exemplarily shows a subscriber terminal 10-1 and another subscriber terminal 10-2) is connected to a server 30 over a network 20. The network 20 can be a wide area network or a local area network, or a combination of both, which transmits data over a wireless link.

The subscriber terminal 10 plays a media file by a player built in a webpage, and shows contents through a graphical interface 110 (exemplarily shows a graphical interface 110-1 and another graphical interface 110-2). During the broadcast, according to the position of the moov box in the media file, the subscriber terminal 10 obtains binary data corresponding to the moov box in the binary data of the media file received from the server 30; binary data corresponding to the standard length of the moov box header in the obtained binary data are sequentially analyzed to obtain the box type of the sub-box and the length of the box data of the sub-box in the moov box; a parser with a type corresponding to the box type of the sub-box is invoked, and binary data in unanalyzed data corresponding to the length of box data are sequentially analyzed to obtain media information represented by box data.

Figure 12:
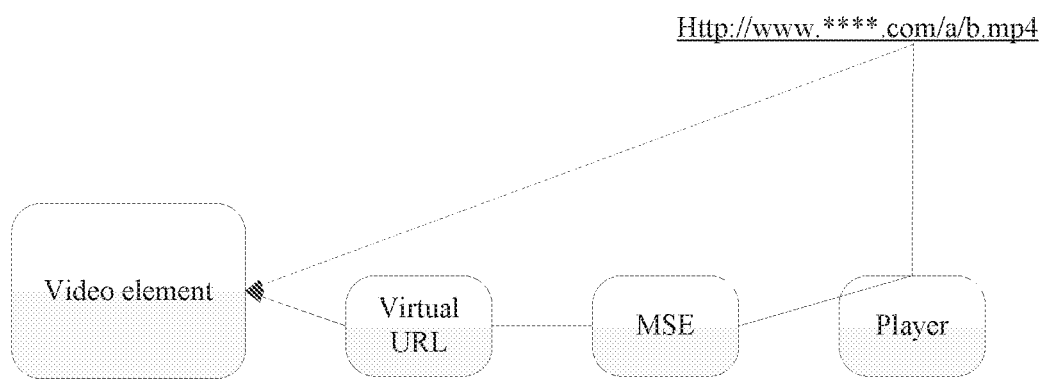
FIG. 12 is a schematic view of converting an MP4 file to an FMP4 file which is played by a media source extension interface provided by an embodiment of the disclosure.

FIG. 12 is a schematic view of converting an MP4 file to an FMP4 file which is played by a media source extension interface. Referring to FIG. 12, the player obtains media data satisfying fixed time based on a real website (http://www.****.com/a/b.mp4 in FIG. 12), then fabricates fragmented media files based on the obtained media data, which means converting to be media files of the fragmented MP4 format; the fragmented media files subsequently are added in the media source object of MSE (i.e. implemented in a manner of Blob). The MSE establishes the virtual URL corresponding to the media source object, and transfers the virtual URL to the video element for the video element to receive the corresponding media source object, which results in encapsulating the extracted media data and the moov describing the media data according to the encapsulation structure of the fragmented media files to obtain fragmented media files able to be applied in independently decoding.

The aforementioned embodiments can efficiently accelerate the analysis of corresponding data in the moov box and prevent slow data analysis that disturbs manipulation of users. Meanwhile, corresponding information obtained by analyzing the moov box can be utilized in converting media information corresponding to the moov.

A person skilled in the art should understand the embodiments of the disclosure could be provided as methods, systems, or computer programs. Therefore, the embodiments of the disclosure can employ forms of hardware embodiments, software embodiments, or embodiments combining software and hardware. Furthermore, the embodiments of the disclosure can adopt forms of computer programs that one or more storage medium including a disk memory and an optic memory with executable codes therein.

The embodiments of the disclosure are illustrated with reference to methods, devices (systems), and flowcharts and/or block diagrams of computer programs. Each process and/or block, and the combination of processes in the flowchart and/or blocks in block diagrams can be performed by computer programs. The computer programs can be provided to processors of a general-purpose computer, a special-purpose computer, an embedded processor or other programmable data processing devices to form an apparatus, as a result, the processors by means of the computer or other programmable data processing devices act as the device performing one or more processes in the flowchart and/or specific functions of one or more blocks in block diagrams.

The computer programs can likewise be stored in the computer readable memory capable of guiding computers or other programmable data processing devices to work in a specific manner, so that the programs stored in the computer readable memory can generate a product including a manipulating device. The manipulating device can perform one or more processes and/or functions specified by one or more blocks in the block diagrams.

The computer programs can further be installed in computers or other programmable data processing devices, so that the computers or other programmable data processing devices can run a series of operating steps to fulfill the process. The manipulation via computers or other programmable devices performs steps of one or more processes in the flowchart and/or functions provided by one or more blocks in block diagrams.

The aforementioned contents merely are preferred embodiments of the disclosure, which should not be used for limiting protective scope of the disclosure. Any modification, equivalent substitution and improvement within the spirit and principle of the disclosure should be included in the protective scope of the disclosure.

What is claimed is:

1. An analysis method of a moov box; wherein the analysis method comprises:
   in response to determining a location of the moov box in a media file, acquiring binary data in the moov box from binary data of the media file, wherein the moov box comprises a plurality of sub-boxes;
   determining a type and a length of a first sub-box among the plurality of sub-boxes based on analyzing a first length of binary data, the first length of binary data corresponding to a box header of the first sub-box and starting from a zero bit in the acquired binary data;
   determining an offset associated with a second sub-box among the plurality of sub-boxes based on the length of the first sub-box;
   determining a type and a length of the second sub-box among the plurality of sub-boxes based on analyzing a second length of binary data, the second length of binary data corresponding to a box header of the second sub-box and starting from a bit corresponding to the offset in the acquired binary data;
   in response to determining that the second sub-box further comprises at least one sub-box, recursively analyzing a standard length of binary data comprised in box data of the second sub-box, the standard length of binary data corresponding to a box header of the at least one sub-box;
   generating an object based on a plurality of nesting relationships, wherein the plurality of nesting relationships comprise a nesting relationship between the moov box and the second sub-box nested in the moov box, and the plurality of nesting relationships further comprise a nesting relationship between the second sub-box and the at least one sub-box nested in the second sub-box;
   in response to determining that the at least one sub-box is a type of box whose box data comprise binary data corresponding to media information, invoking a corresponding parser to obtain the media information represented by box data of the at least one sub-box, and storing an array comprising the media information in the object generated corresponding to the at least one sub-box.

2. The analysis method according to claim 1, further comprising:
   comparing the type of the first sub-box with at least one pre-marked box type; and
   in response to determining that when the type of the first sub-box is a pre-marked type for directly encapsulating binary data corresponding to media information, invoking a parser corresponding to the type of the first sub-box, analyzing box data in the first sub-box by the parser to obtain the media information represented by the box data of the first sub-box.

3. The analysis method according to claim 2, wherein the analysis method further comprises:
   in response to determining that invoking a parser whose type is corresponding to the type of the first sub-box is failed, neglecting to analyze binary data corresponding to the first sub-box, and
   according to a length of the first sub-box, jumping to a section corresponding to a next sub-box in the binary data for continuous analysis.

4. The analysis method according to claim 1, further comprising:
   comparing the type of the second sub-box with at least one pre-marked box type; and
   in response to determining that the type of the second sub-box is a pre-marked type for continuously encapsulating a box, recursively analyzing binary data corresponding to the second sub-box until a type of a box nested in the second sub-box is a pre-marked type for directly encapsulating binary data corresponding to media information based on the standard length of a box header.

5. The analysis method according to claim 4, wherein the analysis method further comprises:
   in response to determining that the type of the box nested in the second sub-box is a pre-marked type for directly encapsulating the binary data corresponding to media information by comparing with at least one pre-marked box type, invoking a parser corresponding to the type of the box nested in the second sub-box, analyzing box data of the box nested in the second sub-box byte by byte to obtain the media information represented by the box data of the box nested in the second sub-box.

6. The analysis method according to claim 1, wherein the analysis method further comprises:
   recording the analyzed at least one sub-box in the invoked corresponding parser; and
   disposing an instance of the recorded at least one sub-box in a property of the at least one sub-box; wherein the property of the at least one sub-box is configured to describe the nesting relationship between the at least one sub-box and the second sub-box in which the at least one sub-box is nested.

7. The analysis method according to claim 1, wherein the analysis method further comprises:
   in response to determining that invoking a parser whose type is corresponding to the type of the at least one sub-box is failed, neglecting to analyze binary data corresponding to the at least one sub-box, and
   according to a length of the at least one sub-box, jumping to a section corresponding to a next sub-box in the binary data for continuous analysis.

8. An analysis device of a moov box, wherein the analysis device comprises:
   at least one processor; and
   at least one memory communicatively coupled to the at least one processor and storing instructions that upon execution by the at least one processor cause the analysis device to:
   acquire binary data corresponding to the moov box from binary data in a media file wherein the moov box comprises a plurality of sub-boxes;
   determine a type and a length of a first sub-box among the plurality of sub-boxes based on analyzing a first length of binary data, the first length of binary data corresponding to a box header of the first sub-box and starting from a zero bit in the acquired binary data;

determine an offset associated with a second sub-box among the plurality of sub-boxes based on the length of the first sub-box;

determine a type and a length of the second sub-box among the plurality of sub-boxes based on analyzing a second length of binary data, the second length of binary data corresponding to a box header of the second sub-box and starting from a bit corresponding to the offset in the acquired binary data;

in response to determining that the second sub-box further comprises at least one sub-box, recursively analyze a standard length of binary data comprised in box data of the second sub-box, the standard length of binary data corresponding to a box header of the at least one sub-box;

generate an object based on a plurality of nesting relationships, wherein the plurality of nesting relationships comprise a nesting relationship between the moov box and the second sub-box nested in the moov box, and the plurality of nesting relationships further comprise a nesting relationship between the second sub-box and the at least one sub-box nested in the second sub-box;

in response to determining that the at least one sub-box is a type of box whose box data comprise binary data corresponding to media information, invoke a corresponding parser to obtain the media information represented by box data of the at least one sub-box, and store an array comprising the media information in the object generated corresponding to the at least one sub-box.

9. The analysis device according to claim 8, wherein the at least one memory further stores instructions that upon execution by the at least one processor cause the analysis device to:

compare the type of the first sub-box with at least one pre-marked box type;

in response to determining that the type of the first sub-box is a pre-marked type for directly encapsulating binary data corresponding to media information, invoke a parser corresponding to the type of the first sub-box, analyzing box data in the first sub-box by the parser to obtain the media information represented by the box data of the first sub-box.

10. The analysis device according to claim 8, wherein the at least one memory further stores instructions that upon execution by the at least one processor cause the analysis device to:

compare the type of the second sub-box with at least one pre-marked box type;

in response to determining that the type of the second sub-box is a pre-marked type to be for continuously encapsulating a box, recursively analyzing binary data corresponding to the second sub-box until a type of a box nested in the second sub-box is a pre-marked for directly encapsulating binary data corresponding to media information based on the standard length of a box header.

11. The analysis device according to claim 10, wherein the at least one memory further stores instructions that upon execution by the at least one processor cause the analysis device to:

in response to determining that the type of the box nested in the second sub-box is a pre-marked type for directly encapsulating the binary data corresponding to media information by comparing with at least one pre-marked box type, invoke a parser corresponding to the type of the box nested in the second sub-box for analyzing the box data of the box nested in the second sub-box byte by byte to obtain the media information represented by the box data of the box nested in the second sub-box.

12. The analysis device according to claim 8, wherein the at least one memory further stores instructions that upon execution by the at least one processor cause the playing device to:

record an analyzed at least one sub-box in the invoked corresponding parser;

dispose an instance of the recorded at least one sub-box in a property of the at least one sub-box; wherein the property of the at least one sub-box is configured to describe the nesting relationship between the at least one sub-box and the second sub-box in which the at least one sub-box is nested.

13. The analysis device according to claim 8, wherein the at least one memory farther stores instructions that upon execution by the at least one processor cause the analysis device to:

in response to determining that invoking a parser whose type is corresponding to the type of the at least one sub-box is failed, neglect to analyze binary data corresponding to the at least one sub-box;

jump to a section corresponding to a next sub-box in the binary data for continuous analysis according to a length of the at least one sub-box.

14. A non-transitory storage medium, storing an executable instruction, disposed to perform operations when the executable instruction is executed by a computing device, the operations comprising:

in response to determining a location of the moov box in a media file, acquiring binary data in the moov box from binary data of the media file, wherein the moov box comprises a plurality of sub-boxes;

determining a type and a length of a first sub-box among the plurality of sub-boxes based on analyzing a first length of binary data, the first length of binary data corresponding to a box header of the first sub-box and starting from a zero bit in the acquired binary data;

determining an offset associated with a second sub-box among the plurality of sub-boxes based on the length of the first sub-box;

determining a type and a length of the second sub-box among the plurality of sub-boxes based on analyzing a second length of binary data, the second length of binary data corresponding to a box header of the second sub-box and starting from a bit corresponding to the offset in the acquired binary data;

in response to determining that the second sub-box further comprises at least one sub-box, recursively analyzing a standard length of binary data comprised in box data of the second sub-box, the standard length of binary data corresponding to a box header of the at least one sub-box;

generating an object based on a plurality of nesting relationships, wherein the plurality of nesting relationships comprise a nesting relationship between the moov box and the second sub-box nested in the moov box, and the plurality of nesting relationships further comprise a nesting relationship between the second sub-box and the at least one sub-box nested in the second sub-box;

in response to determining that the at least one sub-box is a type of box whose box data comprise binary data corresponding to media information, invoking a corresponding parser to obtain the media information represented by box data of the at least one sub-box, and storing an array comprising the media information in the object generated corresponding to the at least one sub-box.

15. The non-transitory storage medium of claim 14, the operations further comprising:
    comparing the type of the first sub-box with at least one pre-marked box type; and
    in response to determining that the type of the first sub-box is a pre-marked type for directly encapsulating binary data corresponding to media information, invoking a parser corresponding to the type of the first sub-box, analyzing box data in the first sub-box by the parser to obtain the media information represented by the box data of the first sub-box.

16. The non-transitory storage medium of claim 14, the operations further comprising:
    comparing the type of the second sub-box with at least one pre-marked box type; and
    in response to determining that the type of the second sub-box is a pre-marked type for continuously encapsulating a box, recursively analyzing binary data corresponding to the second sub-box until a type of a box nested in the second sub-box is a pre-marked type for directly encapsulating binary data corresponding to media information based on the standard length of a box header.

17. The non-transitory storage medium of claim 16, the operations further comprising:
    in response to determining that the type of the box nested in the second sub-box is a pre-marked type for directly encapsulating the binary data corresponding to media information by comparing with at least one pre-marked box type, invoking a parser corresponding to the type of the box nested in the second sub-box, analyzing box data of the box nested in the second sub-box byte by byte to obtain the media information represented by the box data of the box nested in the second sub-box.

18. The non-transitory storage medium of claim 14, the operations further comprising:
    recording the analyzed at least one sub-box in the invoked corresponding parser; and
    disposing an instance of the recorded at least one sub-box in a property of the at least one sub-box; wherein the property of the at least one sub-box is configured to describe the nesting relationship between the at least one sub-box and the second sub-box in which the at least one sub-box is nested.

19. The non-transitory storage medium of claim 14, the operations further comprising:
    in response to determining that invoking a parser whose type is corresponding to a box the type of the at least one sub-box is failed, neglecting to analyze binary data corresponding to the at least one sub-box, and
    according to a length of the at least one sub-box, jumping to a section corresponding to a next sub-box in the binary data for continuous analysis.

* * * * *